US008568662B2

(12) United States Patent
Lee et al.

(10) Patent No.: US 8,568,662 B2
(45) Date of Patent: Oct. 29, 2013

(54) PLASMA REACTION APPARATUS, PLASMA REACTION METHOD USING THE SAME, PLASMA REACTION METHOD OF PERSISTENT GAS, AND APPARATUS FOR DECREASING NOX BY OCCLUSION CATALYST

(75) Inventors: Dae Hoon Lee, Daejeon (KR); Kwan Tae Kim, Daejeon (KR); Young Hoon Song, Daejeon (KR); Min Suk Cha, Daejeon (KR); Jae Ok Lee, Daejeon (KR); Seock Joon Kim, Daejoen (KR)

(73) Assignee: Korea Institute of Machinery and Materials, Daejeon (KR)

( * ) Notice: Subject to any disclaimer, the term of this patent is extended or adjusted under 35 U.S.C. 154(b) by 802 days.

(21) Appl. No.: 11/992,077

(22) PCT Filed: Oct. 9, 2006

(86) PCT No.: PCT/KR2006/004043
§ 371 (c)(1),
(2), (4) Date: Sep. 11, 2009

(87) PCT Pub. No.: WO2007/043783
PCT Pub. Date: Apr. 19, 2007

(65) Prior Publication Data
US 2010/0008831 A1     Jan. 14, 2010

(30) Foreign Application Priority Data

Oct. 10, 2005  (KR) .................. 10-2005-0094929
Nov. 21, 2005  (KR) .................. 10-2005-0111486
Mar. 8, 2006   (KR) .................. 10-2006-0021818
Aug. 1, 2006   (KR) .................. 10-2006-0072722

(51) Int. Cl.
*B01J 19/08* (2006.01)

(52) U.S. Cl.
USPC ............. 422/186; 422/186.04; 422/186.19; 204/168; 204/172

(58) Field of Classification Search
USPC ......... 422/186, 186.04, 186.19; 204/168, 172
See application file for complete search history.

(56) References Cited

U.S. PATENT DOCUMENTS 4,355,627 A * 10/1982 Scarlata .................. 126/400
6,245,309 B1 * 6/2001 Etievant et al. ............ 423/248

(Continued)

FOREIGN PATENT DOCUMENTS

KR    10-0518979 B1    10/2005
KR    10-0522168 B1    10/2005

(Continued)

OTHER PUBLICATIONS

International Search Report for PCT International Application No. PCT/KR2006/004043 dated Dec. 21, 2006.

(Continued)

*Primary Examiner* — Xiuyu Tai
(74) *Attorney, Agent, or Firm* — Rabin & Berdo, P.C.

(57) ABSTRACT

The present invention relates to a plasma reaction apparatus and a plasma reaction method using the same. More particularly, the present invention relates to a plasma reaction apparatus which is applied to the reforming of fuel by generating rotating arc plasma and using the rotating arc being generated, the chemical treatment of a persistent gas, and the apparatus for decreasing NOx by an occlusion catalyst, and a plasma reaction method using the same. For this purpose, a raw material for a reaction is allowed to flow through an inflow hole in a swirl structure so that the raw material forms a rotating flow to progress. Accordingly, the raw material is sufficiently reacted in a plasma reaction space of a restrictive volume, and a high temperature plasma reaction is more promptly performed. Furthermore, a plasma reaction zone is expanded, prior to discharge, by a broad area chamber formed as the width of an upper part of a furnace is expanded, and plasma being generated is expanded and stayed as a pointed end spaced from an electrode at a predetermined interval is formed at an expanded end. Accordingly, the present invention relates to a plasma reaction apparatus and a plasma reaction method using the same, a plasma reaction method of a persistent gas, and an apparatus decreasing NOx by an occlusion catalyst, all of which are capable of excluding the discontinuity of the plasma reaction zone.

6 Claims, 9 Drawing Sheets

(56) References Cited

U.S. PATENT DOCUMENTS

| | | | |
|---|---|---|---|
| 6,322,757 B1 * | 11/2001 | Cohn et al. | 422/186.04 |
| 6,363,716 B1 * | 4/2002 | Balko et al. | 60/286 |
| 7,407,634 B2 * | 8/2008 | Rabinovich et al. | 422/186.04 |
| 2006/0124445 A1 * | 6/2006 | Labrecque et al. | 204/170 |

FOREIGN PATENT DOCUMENTS

| | | |
|---|---|---|
| KR | 10-0561200 B1 | 3/2006 |
| WO | WO 2004/041425 * | 5/2004 |
| WO | WO2004/104385 A1 | 12/2004 |

OTHER PUBLICATIONS

Written Opinion for PCT International Application No. PCT/KR2006/004043 dated Dec. 21, 2006.

International Preliminary Report on Patentability for PCT International Application No. PCT/KR2006/004043 dated Jan. 25, 2008.

* cited by examiner

Raw material : ⟶

Hazardous Gas : ⟶

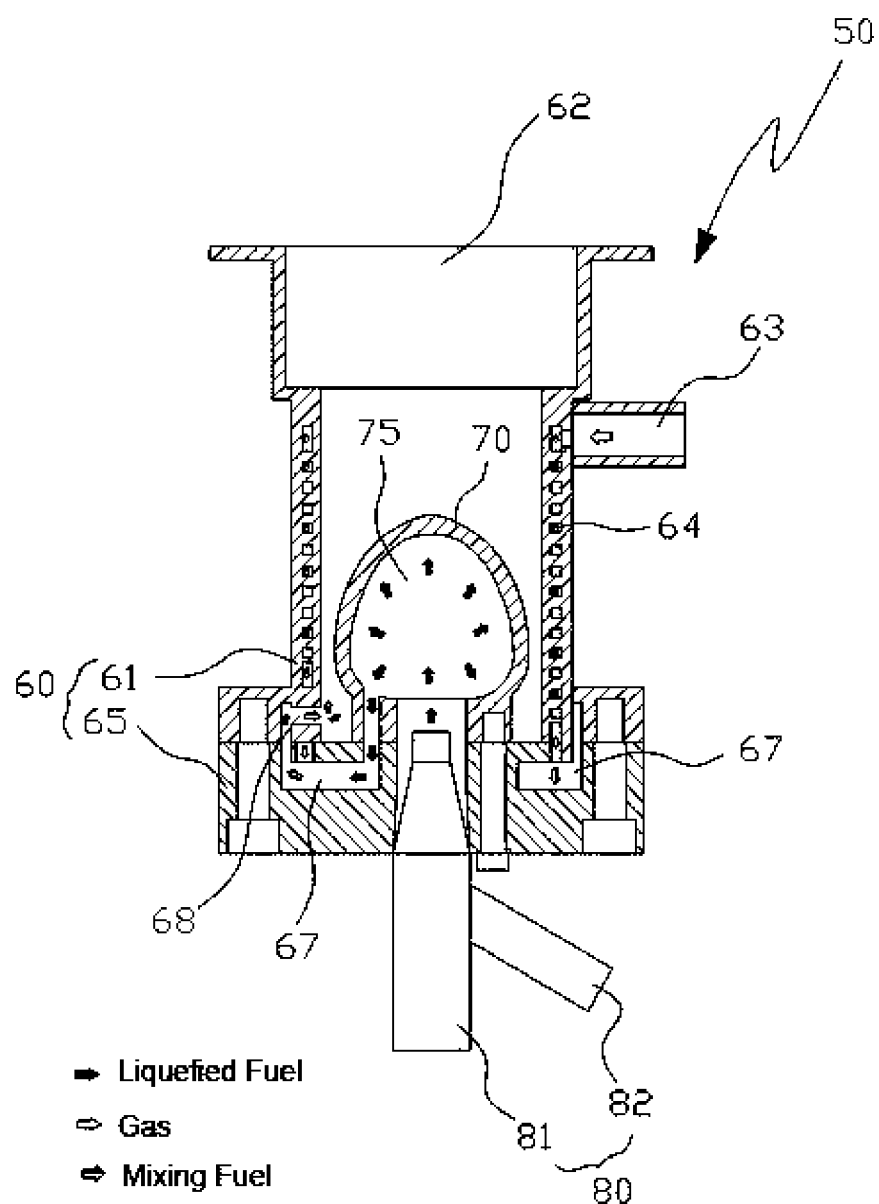

PLASMA REACTION APPARATUS, PLASMA REACTION METHOD USING THE SAME, PLASMA REACTION METHOD OF PERSISTENT GAS, AND APPARATUS FOR DECREASING NOX BY OCCLUSION CATALYST

TECHNICAL FIELD

The present invention relates to a plasma reaction apparatus and a plasma reaction method using the same, and more particularly, to a plasma reaction apparatus which generates rotating arc plasma and which is applied to the reforming of fuel and the chemical treatment of persistent gas, using the rotating arc plasma, and a plasma reaction method using the same.

BACKGROUND ART

In general, states of matters are divided into three states, i.e., a solid, a liquefied and a gas. When energy is applied to a solid, the sold becomes a liquefied, and when the energy is further applied to the liquefied, the liquefied becomes a gas. When the higher energy is applied to the gas, there is generated plasma in a fourth state of matter which consists of electrons and ions having electric polarity. In nature, plasma is observed in the form of lightening, an aurora, and an ion layer in the air. In daily life, artificially produced plasma is included in a fluorescent lamp, a mercury lamp and a neon sign.

When a gas with high kinetic energy is collided at ultra high temperature, electrons with negative electric charges are dissociated from atoms or molecules, thereby making the plasma. The plasma means the gaseous state which is divided into the electrons with negative electric charges and the ions with positive electric charges. Plasma has the degree of ionization of the electric charges which is significantly high. Plasma generally contains the negative electric charges and the positive electric charges in about equal numbers, so that the electric charges are distributed in about equal density. Therefore, plasma is almost in an electrically neutral state.

The plasma is classified as high temperature plasma and low temperature plasma. The high temperature plasma has high temperature like an arc. The low temperature plasma has nearly normally room temperature because the energy of the ions is low whereas the energy of the electrons is high. The plasma is generated by applying the electrical methods, such as direct current, super-high frequency and electron beam, and is maintained by using the magnetic field.

A plasma generating technique and plasma practical use considerably vary depending on the pressure condition at which the plasma is generated. Since the plasma is stably generated on the vacuum condition with low pressure, the plasma generated in this manner is used for chemical reaction, deposition and corrosion in a semiconductor device fabrication process and a new material composition process. The plasma generated on the air pressure condition is used for processing a harmful gas to environment or manufacturing a new matter.

A plasma reaction apparatus for using the plasma needs to have the operability to start a reaction promptly, the high durability, and the efficiency on reaction. Upon the plasma reaction, the forms of an electrode and a furnace and the conditions for reaction (for example, a voltage and an additive) are decisive factors for the plasma reaction. Accordingly, a desirable constitution of the plasma reaction apparatus needs to be presented to correspond with the required performance, and a technique of a plasma reaction method needs to be presented for the optimization of the reaction conditions.

DISCLOSURE OF INVENTION

Technical Problem

The present invention provides a plasma reaction apparatus which enables a raw material to be sufficiently reacted within a plasma reaction space having a restrictive volume and enables a high plasma reaction to be faster performed, and a plasma reaction method using the same, and various plasma apparatuses relating to the plasma reaction apparatus and the plasma reaction method using the same, in which a plasma reaction zone is expanded to temporarily stay before it is discharged, thereby excluding the discontinuity of the plasma reaction zone.

The present invention also provides, as an application field, a plasma reaction method of a persistent gas, which effectively resolves a persistent gas by maintaining a plasma region, which is formed inside a furnace, at higher temperature, increasing an average collision path of electrons, and generating radicals and ions with high reactivity.

The present invention also provides, as another application field, a plasma reactor which independently supplies a reducing ambient gas of high temperature, which does not interfere an operation of an engine, and which promptly supplies the ambient gas by a prompt reaction which is the characteristic of a plasma reforming reaction when needed, and an apparatus for decreasing NOx by an occlusion catalyst, using the plasma reactor.

The present invention also provides a plasma reactor which realizes the simplification of the constitution by receiving fuel from a storage for supplying the fuel to an engine so that is realized and which insignificantly improves the reforming performance of the fuel by effectively mixing the liquefied fuel and gas being supplied to the plasma reactor, and an apparatus for decreasing NOx by an occlusion catalyst, using the same.

Advantageous Effects

As described above, when persistent gas, hydrocarbon fuel and an oxidizer as partial oxidation conditions are flowed into the inside of a furnace and a plasma region is maintained at higher temperature by heat generated by the oxidation reaction of the fuel, an average collision path of electrons is increased and radicals and ions with high reactivity in the oxidation reaction are generated, thereby effectively resolving the persistent gas.

Furthermore, a plasma reaction zone generated upon a plasma reaction is stayed by an expansion section formed in a furnace and by a tip part formed upon the expansion, thereby realizing a continuous plasma reaction.

Furthermore, a raw material is flowed into an intake hole having a swirl structure and the raw material progresses in a rotating flow, thereby enabling the raw material to be sufficiently reacted in a plasma reaction space with a restrictive volume and enabling a faster high temperature plasma reaction to be formed.

Furthermore, prior to discharge, a plasma reaction zone is expanded through a broad area chamber formed as an upper width of a furnace is expanded, and the plasma reaction zone is temporarily stayed, thereby removing discontinuity of the plasma reaction zone.

Consequently, the above-described effects achieve the objects of the present invention to improve the reaction efficiency upon the reforming reaction of raw materials being supplied or upon the process of harmful matters and to enhance the reliability of resultant products and to be advantageous to environment.

BRIEF DESCRIPTION OF THE DRAWINGS

FIG. 12 is a sectional view of a flow of a fluid in the plasma reactor of FIG. 11.

BEST MODE FOR CARRYING OUT THE INVENTION

The present invention will now be described more fully and clearly hereinafter with reference to the accompanying drawings, in which preferred embodiments of the invention are shown.

Figure 1:
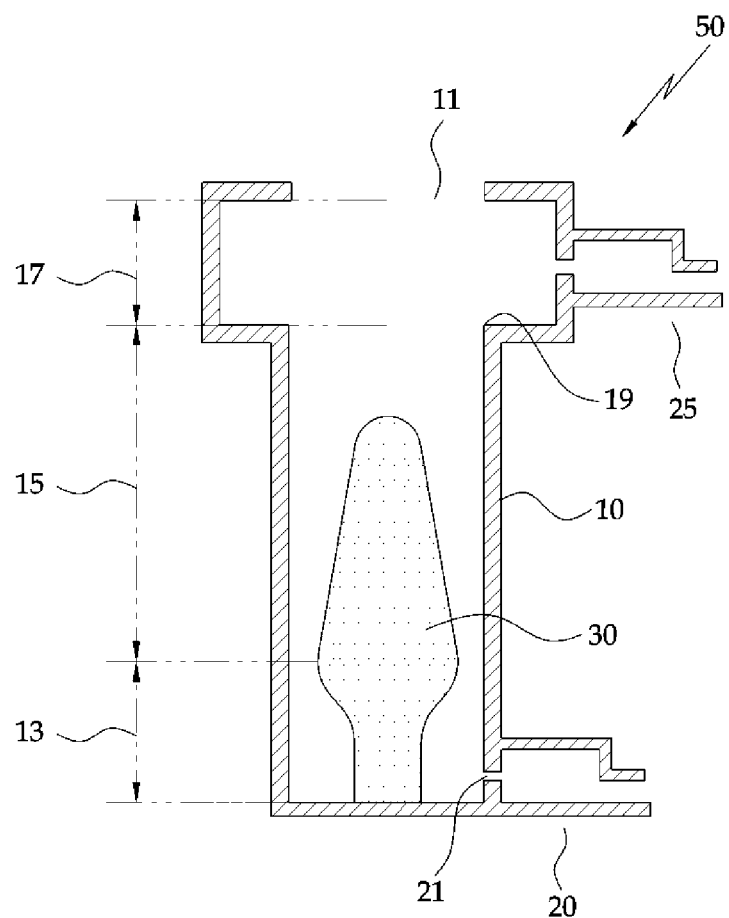
FIG. 1 is a vertical sectional view illustrating a plasma reaction apparatus according to a first embodiment of the present invention.
Figure 2:
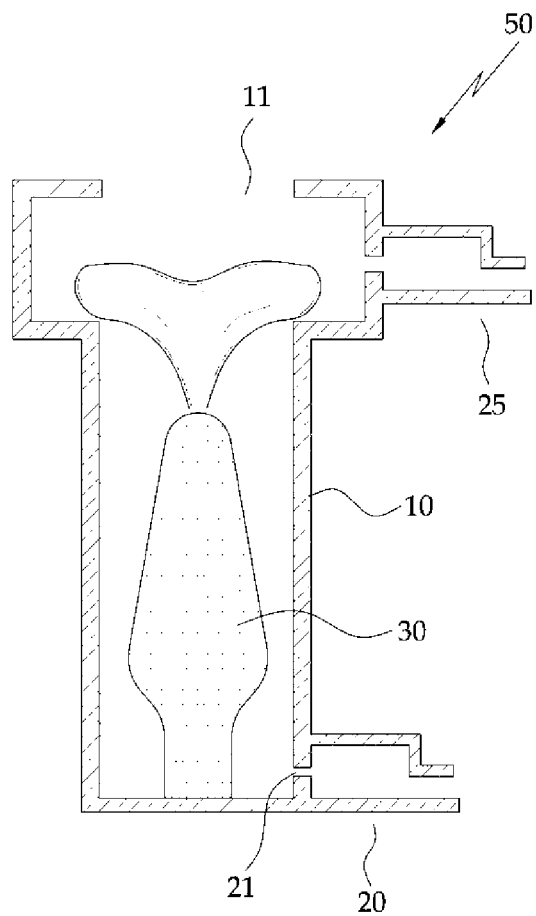
FIG. 2 is a vertical sectional view illustrating a plasma reaction zone which is expanded by the plasma reaction apparatus of FIG. 1.
Figure 3:
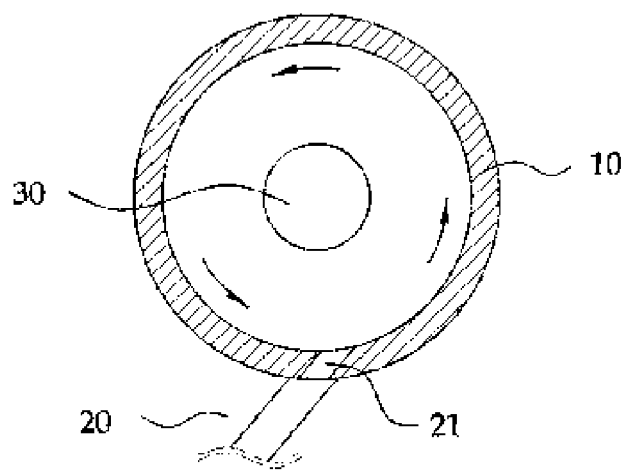
FIG. 3 is a cross sectional view illustrating a structure in which a raw material inflow pipe is operatively connected to a furnace in the plasma reaction apparatus of FIG. 1.

FIG. 1 is a vertical sectional view illustrating a plasma reaction apparatus according to a first embodiment of the present invention, FIG. 2 is a vertical sectional view illustrating a plasma reaction zone which is expanded by the plasma reaction apparatus of FIG. 1, and FIG. 3 is a cross sectional view illustrating a structure in which a raw material inflow pipe is operatively connected to a furnace in the plasma reaction apparatus of FIG. 1.

A plasma reaction apparatus comprises: a furnace, a raw material inflow pipe, and an electrode. The furnace is hollow and includes a discharge opening, formed at an upper part of the furnace, for discharging a plasma reactant. The raw material inflow pipe for supplying a raw material for a plasma reaction to the inside of the furnace is operatively connected to a lower part of the furnace, and an intake opening positioned inside the furnace is formed to be tilted at a predetermined angle to a normal direction of an outer circumference surface of the furnace, so that the raw material being supplied is progressed in the form of a rotating flow inside the furnace.

The electrode for generating a discharge voltage for the plasma reaction of the raw material being supplied to the inside of the furnace is positioned at the bottom of the furnace and is spaced from an inner wall of the furnace at a predetermined interval. The furnace is characterized in that the width of a section positioned above the electrode is expanded. Accordingly, when the raw material being supplied to the inside of the furnace makes the plasma reaction, the furnace expands a plasma reaction zone, thereby forming a broad chamber to temporarily stay the plasma reaction zone.

A plasma reaction method using a plasma reaction apparatus, comprises: supplying a raw material for a plasma reaction to the inside of a furnace by operatively connecting a raw material inflow pipe to the furnace, wherein the furnace is hollow and includes a discharge opening, formed at an upper part of the furnace, for discharging a plasma reactant, and the raw material inflow pipe includes an intake opening positioned inside the furnace which is formed to be tilted at a predetermined angle to a normal direction of an outer circumference surface of the furnace, so that the raw material being supplied is progressed in the form of a rotating flow inside the furnace; allowing the raw material being supplied to make a plasma reaction by a discharge voltage between an inner wall of the furnace and an electrode, wherein the electrode is positioned at the bottom of the furnace and spaced from the inner wall of the furnace at a predetermined interval; and forming a broad area chamber inside the furnace by expanding the width of a section positioned above the electrode, so that a plasma reaction zone is expanded and temporarily stayed in the broad area chamber upon the plasma reaction of the raw material being supplied to the inside of the furnace.

As illustrated in FIGS. 1 through 3, a plasma reaction apparatus 50 comprises a furnace 10, an electrode 30 and a raw material inflow pipe 20.

The furnace 10 is formed, including a hollow to form a space for a plasma reaction. The specific structure and shape of the furnace will be described later.

The electrode 30 for generating a discharge voltage for the plasma reaction of a raw material being supplied to the inside of the furnace 10 is positioned at the bottom of the furnace 10 and spaced from an inner wall of the furnace 10 at a predetermined interval. The electrode 30 has the following characteristics in shape.

The electrode 30 includes an upper part in a conical shape and a lower part extended in a cylindrical shape. Accordingly, in the electrode 30, the width of an about middle part is relatively expanded compared to the other parts. The extended lower part in the cylindrical shape of the electrode 30 is relatively narrow in width, compared to the upper part of the electrode 30. The summit of the conical shape and the portion connecting the conical shape and the cylindrical shape are curved roundly.

According to the characteristic shape of the electrode 30, a reaction chamber 15 is formed in a section in which the electrode 30 is positioned inside the furnace 10. In the reaction chamber 15, a plasma reaction is performed by a raw material flowing from a raw material inflow pipe 20, described later, and a raw material inflow chamber 13 to which the raw material inflow pipe 20 is operatively connected. That is, the raw material inflow chamber 13 and the reaction chamber 15 are divided by a middle portion (corresponding to a lower part of the conical shape) in which the width of the electrode 30 is expanded. The raw material inflow chamber 13 is extendedly formed in a narrow cylindrical shape. Since the interval between the portion in which the width of the electrode 30 is expanded and the inner wall of the furnace 10 becomes relatively narrow, the raw material being flowed into the furnace does not immediately progress to the reaction chamber 15. Rather, after the raw material is temporarily stayed in the raw material inflow chamber 13 of a relatively large volume and is sufficiently mixed, the raw material is progressed to the reaction chamber 15. That is, the above-described shape of the electrode 30 enables the section in which the electrode 30 is formed inside the furnace 10 to divide the raw material inflow chamber 13 and the reaction chamber 15, enables the raw material inflow chamber 13 to have a sufficient volume, and enables the raw material supplied from the raw material inflow chamber 13 to be restrictively progressed into the reaction chamber 15 so that the raw material is sufficiently mixed.

The raw material inflow pipe 20 is operatively connected to a lower part of the furnace 10, to allow the raw material for the plasma reaction to flow into the raw material inflow chamber 13 inside the furnace 10. The number of the raw material inflow pipes is not limited. An intake opening (hereinafter, referred to as a inflow hole) positioned in the furnace connected to the raw material inflow pipe 20 is formed to be tilted to a wall surface of the furnace 10, that is, the inflow hole 21 has a swirl shape. The inflow hole 21 allows the raw material to form a rotating flow and progress in the furnace. This enables the raw material to form the rotating flow and progress in the reaction chamber 15. Accordingly, the raw material rotates in a circumference direction and moves upwardly rather than it directly moves upwardly along a length direction of the furnace 10. The rotating progress of the raw material enhances the efficiency on the plasma reaction to the same volume.

According to the first embodiment of the present invention, the structure and shape of the furnace 10 is desirably presented as follows:

The furnace 10 is formed including a hollow. The appearance of the furnace 10 has nearly a cylindrical shape. As described above, the lower part of the furnace 10 is connected to the raw material inflow pipe 20. The upper part of the furnace 10 is opened to form a discharge opening 11. The discharge opening 11 is formed to discharge a plasma reactant. The upper part of the furnace 10 is expanded in width, thereby forming a broad area chamber 17 at the upper part in the furnace 10. The broad area chamber 17 may be positioned above the top tip of the electrode 30. That is, the furnace 10 has the wider section positioned above the electrode 30. According to the above description, the raw material inflow chamber 13, the reaction chamber 15 and the broad area chamber 17 are sequentially formed from the lower position to the upper position in the furnace 10. Since the broad area chamber 17 is expanded than the reaction chamber 15, when the raw material makes the plasma reaction in the reaction chamber 15, a plasma reaction zone is expanded through the broad area chamber 17 and is temporarily stayed. Then, the time for which a plasma reaction product is stayed is increased, thereby making it favorable for an additional high temperature reaction and resulting in the acting effect of excluding the discontinuity of plasma formation. The point to divide the broad area chamber 17 and the reaction chamber 15 in the furnace 10, that is, the start point at which the inside of the furnace 110 is expanded, may be formed in a pointed end 19 rather than a round curve. For this purpose, the section positioned above the electrode 30 in the furnace 10 is formed and expanded in a right-angled shape. According to the structure in which the furnace 10 is expanded in the right-angle shape, the horizontal expansion of the plasma reaction zone in the broad area chamber 17 is increased, and the plasma reaction is continuously performed since the pointed end 19 with plasma is rotated.

When staying plasma is formed by the broad area chamber 17, rotating plasma is formed through the pointed end 19 formed between the reaction chamber 15 and the broad area chamber 17 from the top tip of the electrode 30. The distance from the pointed end 19 formed between the reaction chamber 15 and the broad area chamber 17 to the top tip of the electrode 30 is a factor to decide a thermal characteristic of the plasma being formed.

An auxiliary raw material inflow pipe 25 for supplying an additional raw material to the broad area chamber 17 is operatively connected to the furnace 10, thereby enabling an additional reaction by the added raw material in the broad area chamber 17.

When the diameter of the discharge opening 11 is formed to be smaller than the diameter of the broad area chamber 17 in the furnace 10, the plasma reactant may more stay or stop in the broad area chamber 17. In the first embodiment, the upper part of the furnace is expanded once but it may be expanded in a number of steps and/or in a number of times. Such modification is within the scope of the present invention.

In the shape of the reactor, when the expanded region is formed, in the form of a step, at the rear of the reactor, the plasma being formed on conditions does not leave and is attached to the tip of the electrode while it continuously discharges and rotates. On the conditions that hydrocarbon fuel is partially oxidized, the staying plasma becomes persistent due to the high temperature and the concentration of a matter with high reactivity (for example, electrons and ions), thereby improving the performance in resolving the gas and in reforming the fuel.

Figure 4:
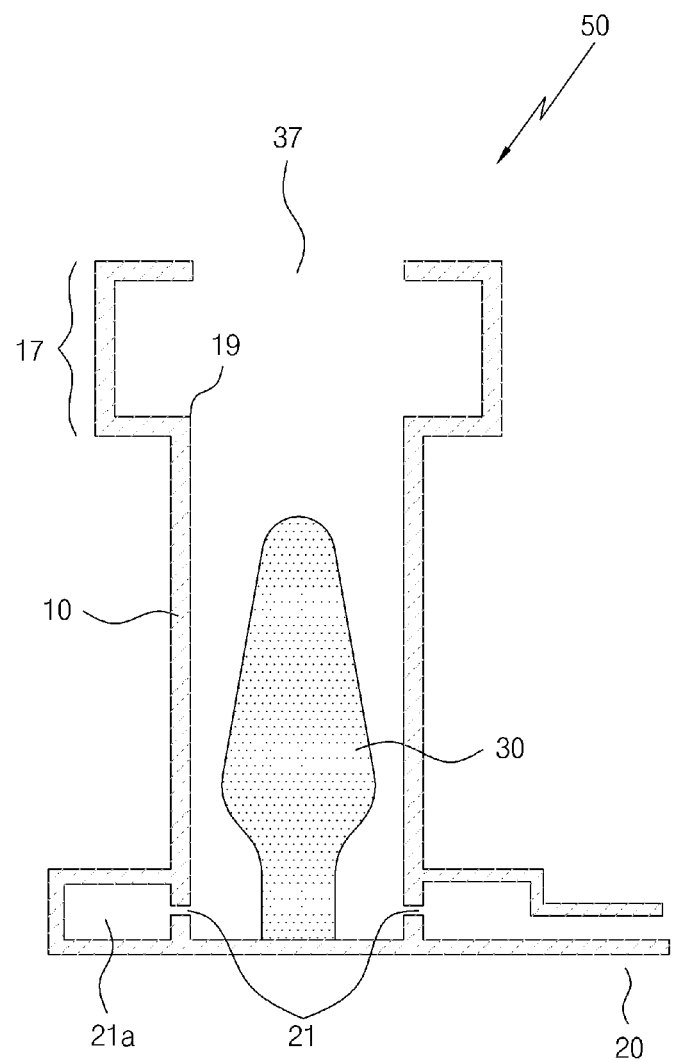
FIG. 4 is a vertical sectional view illustrating a plasma reaction apparatus according to a second embodiment of the present invention.
Figure 5:
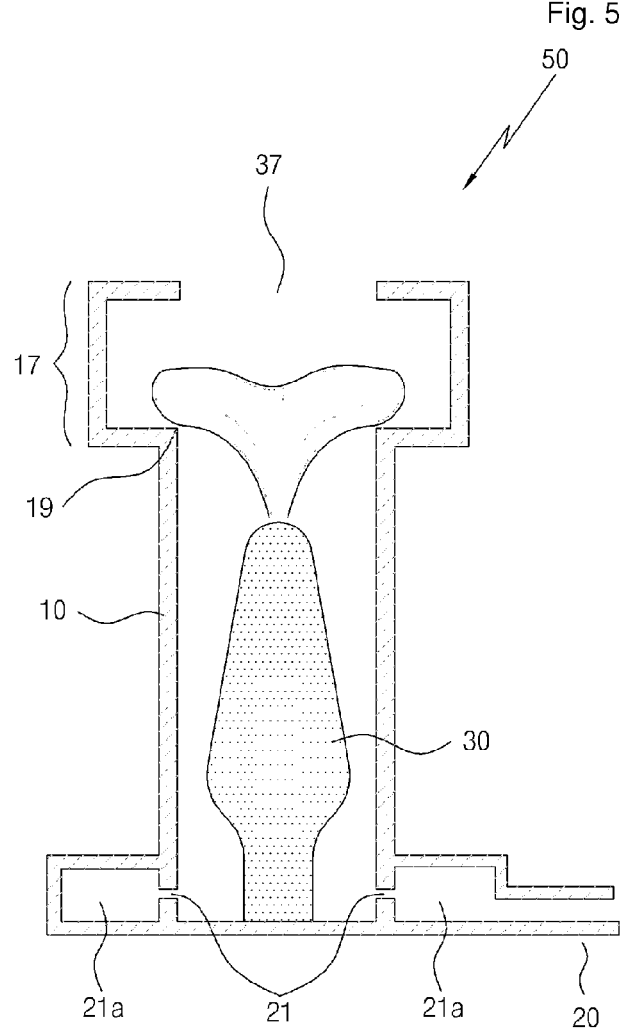
FIG. 5 is a vertical sectional view illustrating a plasma reaction zone which is stayed by the plasma reaction apparatus of FIG. 4.
Figure 6:
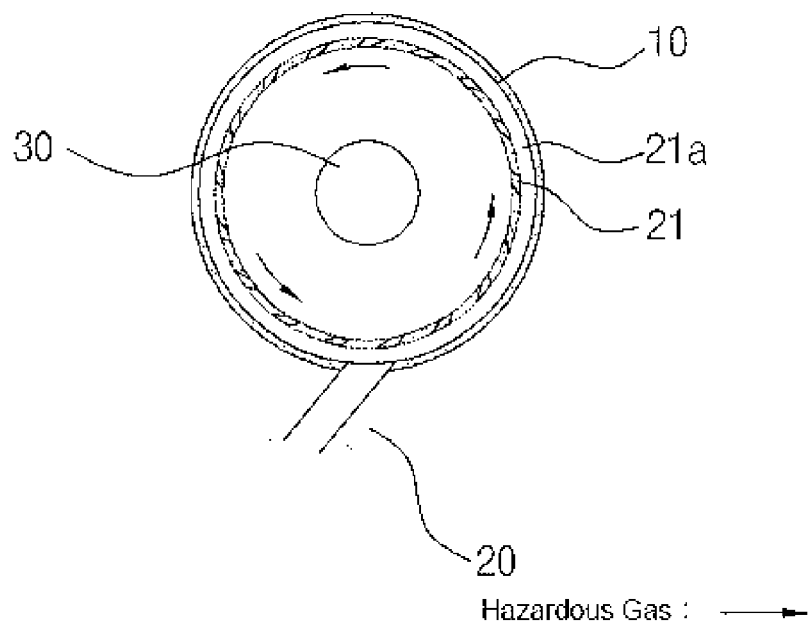
FIG. 6 is a cross sectional view illustrating the plasma reaction apparatus of FIG. 4.

FIG. 4 is a vertical sectional view illustrating a plasma reaction apparatus according to a second embodiment of the present invention, FIG. 5 is a vertical sectional view illustrating a plasma reaction zone which is stayed by the plasma reaction apparatus of FIG. 4, and FIG. 6 is a cross sectional view illustrating the plasma reaction apparatus of FIG. 4.

The second embodiment of the present invention will be described, in detail, as follows:

A plasma reaction method of resolving a persistent gas comprises: flowing a persistent gas, hydrocarbon fuel and an oxidizer into a furnace through a raw material inflow pipe operatively connected to the furnace, so that when the persistent gas makes a plasma reaction by a discharge voltage generated between an electrode installed in the furnace and an inner wall of the furnace, a plasma region is in a higher temperature state by heat generated by an oxidation reaction of the fuel and is lower in density; making a continuous plasma reaction by allowing a plasma reaction zone generated upon the plasma reaction to stay in an expanded section formed as the width of a section positioned above the electrode in the furnace is expanded, forming a step at a right angle in a length direction of the furnace; and forming a number of inflow holes on a wall surface of the furnace and so as to be tilted at a predetermined angle to a normal direction of the inner wall of the furnace, the inflow holes for operatively connecting the raw material inflow pipe and the inside of the furnace.

The present invention having the above-described characteristics will be more clearly described with reference to a preferred embodiment thereof.

Before the preferred embodiment of the present invention will be described, it is noted that the present invention relates to a method of resolving a persistent gas by a plasma reaction and the persistent gas may be any one of typical gases causing the global warming, such as $CF_4$, $C2F_6$, $SF_6$ and NF or a mixture thereof but any other persistent gases are within the scope of the present invention.

The preferred embodiment of the present invention will be described with reference to the accompanying drawings.

According to the second embodiment of the present invention, the desirable constitution and structure of a plasma reaction apparatus 50 for a plasma reaction of a persistent gas is presented.

A raw material inflow pipe 20 for allowing the inflow of a persistent gas, hydrocarbon fuel and an oxidizer which are subject to a plasma reaction is connected to a furnace 10 including a hollow. An electrode 30 for generating a discharge voltage for the plasma reaction between the electrode 30 and the inner wall of the furnace 10 is installed in the furnace 10.

In the structure of operatively connecting the raw material inflow pipe 20 to the furnace 10, a number of inflow holes 21 are formed on a wall surface of the furnace 10, for the operative connection between the raw material inflow pipe 20 and the inside of the furnace 10. The inflow holes 21 are formed to be tilted at a predetermined angle to a normal direction of the inner wall of the furnace 10. A space 21a in which the gases (the persistent gas, the fuel and the oxidizer) to flow into the furnace 10 are temporarily stayed is formed between the inflow holes 21 of the furnace 10 and the raw material inflow pipe 10.

According to the foregoing, the gases flowing through the raw material inflow pipe 20 temporarily stay in the space 21a and then uniformly spread inside of the furnace 10 through the number of inflow holes 21. As the inflow holes 21 are formed to be tilted, the gases being flowed into form a rotating flow and progress inside the furnace 10.

As described above, a broad area chamber 17 for staying a plasma reaction zone generated upon the plasma reaction is formed inside the furnace 10. The broad area chamber 17 is formed as the width of a section positioned above the electrode 30 is expanded in the furnace 10.

The section positioned above the electrode 30 in the furnace 10 is expanded forming a step at a right angle in a length direction of the furnace 10. Accordingly, a pointed end 19 is formed at a start point when the expanded section is formed in the furnace 10.

In the plasma reaction apparatus 50 with the above-described structure, the persistent gas, the hydrocarbon fuel and the oxidizer are first flowed into the furnace through the raw material inflow pipe 20 on the partial oxidization conditions. In the second embodiment, $CH_4$ is used as the fuel and $O_2$ is used as the oxidizer.

Any other combustible gases may be used as the fuel and any other gases to induce an oxidation reaction of the fuel may be used as the oxidizer.

The persistent gas, the fuel and the oxidizer may be sequentially or simultaneously flowed into the furnace 10.

That is, after the fuel and the oxidizer are flowed into the furnace 10, the persistent gas may be flowed into the furnace 10. Or the fuel, the oxidizer and the persistent gas may be flowed into the furnace 10 simultaneously.

As described above, when the persistent gas, the fuel and the oxidizer are flowed into the furnace 10, the persistent gas makes the plasma reaction by the discharge voltage generated between the electrode 30 being installed inside the furnace 10 and the inner wall of the furnace 10. Then, the plasma region is in a higher temperature state by the heat generated by the oxidation reaction of the fuel, thereby lowering the density of the plasma region. In the expanded plasma reaction zone, the density of electrons is increased since an electric current becomes higher, and the dissolution of the persistent gas is speeded up as radicals with high reactivity generated during the collision with the electrons and the oxidation reaction are rapidly increased. In addition, the radicals and ions with the high reactivity are generated during the oxidation reaction of the fuel, thereby improving the reactivity.

Consequently, the fuel and the oxidizer increase the efficiency on the plasma reaction of the persistent gas, thereby enhancing the resolvability of the persistent gas. Furthermore, the broad area chamber 17 formed inside the furnace 10 enables the continuous plasma reaction of the persistent gas.

According to the second embodiment of the present invention, the broad area chamber 17 formed in the furnace 10 expands the plasma reaction zone generated by the plasma reaction of the persistent gas inside the furnace 10, and the pointed end 19 formed at the start point of the broad area chamber 17 holds the plasma reaction zone, so that the plasma reaction zone is stayed in the broad area chamber 17 rather than it is directly discharged through a discharge opening 37 of the furnace 10. Furthermore, since the persistent gas flowed into the furnace 10 forms the rotating flow inside the furnace 10 as described above, the plasma reaction zone is likely to be more attached to the pointed end 19 of the broad area chamber 17.

As described above, when the plasma reaction zone is stayed inside the furnace 10, the persistent gas which is subsequently flowed into the furnace 10 continuously makes the plasma reaction by the plasma reaction zone being once generated. Consequently, the continuous plasma reaction is made, thereby preventing a loss on reaction caused by the discontinuous plasma reaction made by the plasma reaction zone which is periodically and repeatedly generated.

Figure 7:
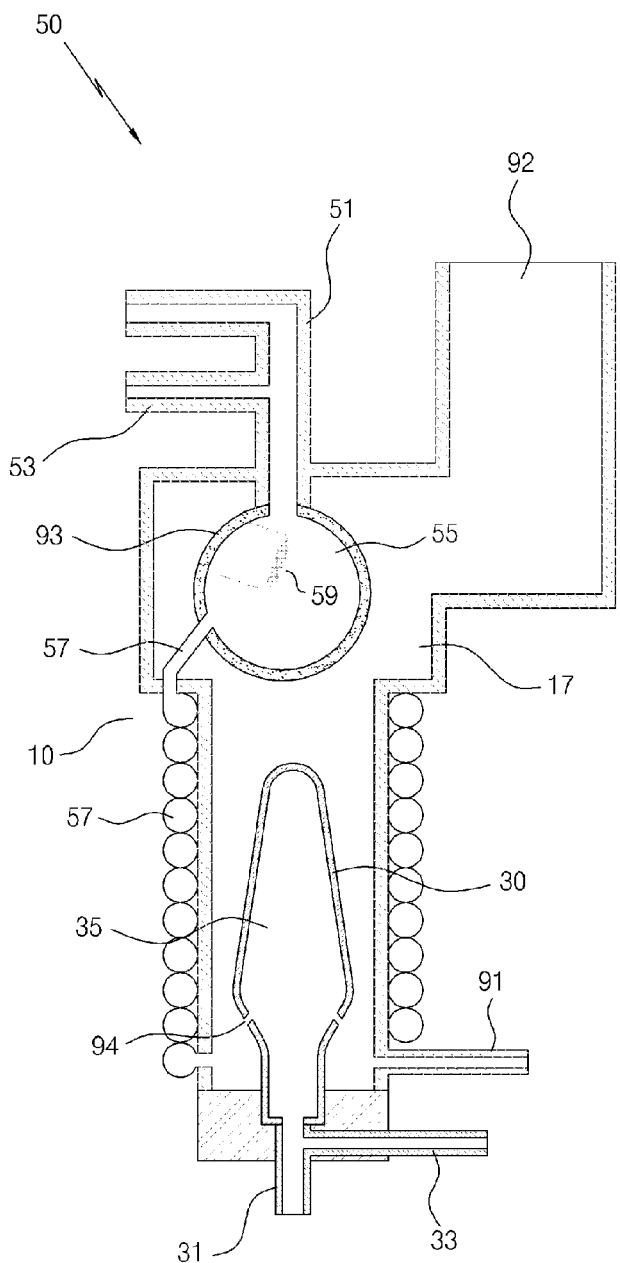
FIG. 7 is a vertical section view illustrating a plasma reaction apparatus according to a third embodiment of the present invention.
Figure 8:
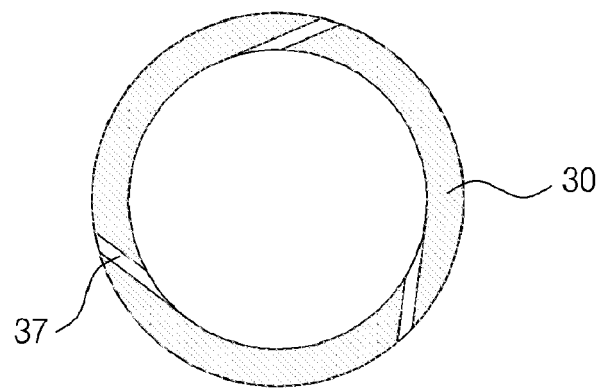
FIG. 8 is a cross sectional view illustrating a structure in which an inflow path is formed at an electrode in the plasma reaction apparatus of FIG. 7.

FIG. 7 is a vertical section view illustrating a plasma reaction apparatus according to a third embodiment of the present invention, and FIG. 8 is a cross sectional view illustrating a structure in which an inflow path is formed at an electrode in the plasma reaction apparatus of FIG. 7. The third embodiment of the present invention will be described as follows:

A plasma reaction apparatus according to the third embodiment of the present invention comprises: a furnace; an electrode and a heat absorption tank. The furnace includes a lower part side to which a raw material inflow pipe for supplying a raw material for a plasma reaction is connected, an upper part at which a discharge opening for discharging a plasma reactant is formed, and a hollow in which a section positioned above an electrode is expanded in width, thereby forming a broad area chamber for temporarily staying a plasma reaction zone when the raw material being supplied to the inside of the furnace makes the plasma reaction. The electrode is protruded towards the inside of the furnace, for generating a discharge voltage for the plasma reaction of the raw material being supplied. The electrode is put into and connected to the bottom of the furnace and spaced from the wall surface of the furnace at a predetermined interval. The heat absorption tank is operatively connected to each of a liquefied raw material inflow pipe for allowing a liquefied raw material to flow into a chamber formed in the furnace and a liquefied raw material supply pipe with one side connected to the furnace, for supplying the liquefied raw material flowed into the chamber to the inside of the furnace. The heat absorption tank is positioned in the broad area chamber, so that the liquefied raw material flowed into the chamber absorbs heat in the chamber.

The plasma reaction apparatus with the above-described characteristics will be more clearly described with reference to a preferred embodiment thereof.

The plasma reaction apparatus according to the preferred embodiment of the present invention will be described, in detail, with reference to the accompanying drawings.

Before the plasma reaction apparatus according to the third embodiment is described, it is noted that the present invention relates to an apparatus for performing a reforming reaction of a liquefied or gaseous raw material by a plasma reaction or an apparatus for disposing of a raw material of various harmful matters, such as, waste matter and automobile exhaust gas, by a plasma reaction, and that the raw material mentioned below includes chemical compositions and various harmful matters which are harmful to environment.

As illustrated in FIGS. 7 and 8, the plasma reaction apparatus 50 according to the third embodiment largely comprises a furnace 10, an electrode 30 and a heat absorption tank 93.

The furnace 10 includes a hollow for providing a space for a plasma reaction and has an about cylindrical shape. The furnace 10 includes a lower part side to which a raw material inflow pipe 91 for receiving a raw material for the plasma reaction is connected, and an upper part at which a discharge opening 92 for discharge a plasma reactant is formed.

The characteristic structure and shape of the furnace 10 will be more specifically described as follows:

In the upper part of the furnace 10, a broad area chamber 17 is formed as the width of a section positioned above the electrode 30 is expanded. When the broad area chamber 17 is formed inside the furnace 10, a plasma reaction zone, which is formed by the plasma reaction in the section in which the electrode 30 is positioned in the furnace 10, is expanded through the broad area chamber 17 and is temporarily stayed there. Accordingly, the time for which a plasma reaction product is stayed is increased, thereby making it favorable to an additional reaction at a high temperature and resulting in the acting effect of excluding the discontinuity of plasma formation. Since the plasma reaction zone is stayed, a region of a higher temperature is formed in the broad area chamber 17. This is favorable for a liquefied raw material to absorb heat in the heat absorption tank 93, which will be described later. The upper part of the furnace 10 is bent, forming a step at a right angle. The discharge opening 92 formed at the top in the upper part of the furnace 10 is not positioned at a vertically extending line of the broad area chamber 17. According to the above-described structure, the plasma reaction zone is more stayed in the broad area chamber 17. As a deriving acting effect, a more reliable region of a high temperature is formed in the broad area chamber 17.

The electrode 30 is protruded towards the inside of the furnace 10 and generates a discharge voltage for the plasma reaction of the raw material being supplied to the inside of the furnace 10. The electrode 30 is spaced from the wall surface of the furnace 10 at a predetermined interval and is put through the bottom of the furnace 10 to be connected thereto. The electrode 30 is connected to an outside power supply (not shown) for generating the voltage. The electrode 30 has the following characteristics in shape:

An upper part of the electrode 30 has a conical shape and a lower part thereof has an extended cylindrical shape. Accordingly, in the electrode 30, the width of an about middle part corresponding to the bottom of the conical shape is relatively expanded, compared to the other parts. The lower part being extendedly formed in the cylindrical shape is relative narrow in width, compared to the upper part of the electrode 30. The summit of the conical shape and the portion connecting the conical shape and the cylindrical shape are roundly curved in the electrode 30. According to the above-described structure, the interval between the electrode 30 and the inner wall of the furnace 10 is different depending on a height direction of the electrode 30. That is, the interval between the electrode 30 and the inner wall of the furnace 10 is narrow around the middle part of the electrode 30, and the interval maintains a relatively broad space from the inner wall of the furnace 10 in the upper part and lower part around the middle part of the electrode 30. Accordingly, when the raw material is flowed into a section positioned below the middle part of the electrode 30 in the furnace 10, since the interval between the middle part of the electrode 30 and the inner wall of the furnace 10 is narrow, the raw material is temporarily stayed and is sufficiently mixed at the lower part of the electrode 30 and is progressed rather than it is directly progressed to the upper part of the electrode 30.

Further, the electrode includes a structure for additionally supplying a liquefied raw material, and this will be described below:

A raw material inflow chamber 35 with a predetermined space is formed inside the electrode 30. An auxiliary liquefied raw material supply pipe 31 for allowing a liquefied raw material to flow into the raw material inflow chamber 35 is connected to the bottom of the electrode 30. An inflow path 94 for supplying the raw material in the raw material inflow chamber 35 to the inside of the furnace 10 (preferably, to the lower part of the electrode) is formed through the inner wall of the electrode 30. Accordingly, the liquefied raw material is additionally supplied to the inside of the furnace 10, without connecting any additional pipes to the furnace 10.

An auxiliary gas supply pipe 33 is operatively connected to the auxiliary liquefied raw material supply pipe 31. Accordingly, the liquefied raw material and the gas for separating the liquefied raw material in fine particles are flowed into the raw material inflow chamber 35, thereby enabling the liquefied raw material to be sufficiently dispersed inside the raw material inflow chamber 35 and the furnace 10.

The heat absorption tank 93 is installed in the furnace 10, to be positioned in the broad area chamber 17. The heat absorption tank 93 has a sphere shape in appearance. A chamber 55 with a predetermined space is formed inside the heat absorption tank 93. The heat absorption tank 93 is operatively connected to a liquefied raw material inflow pipe 51 for allowing the liquefied raw material to flow into the chamber 55. The heat absorption tank 93 is operatively connected to a liquefied raw material supply pipe 57 for supplying the liquefied raw material which flows into the chamber 55 to the inside of the furnace 10. That is, the liquefied raw material supply pipe 57 has one side being operatively connected to the furnace 10 and the other side being operatively connected to the heat absorption tank 93, thereby allowing the liquefied raw material in the chamber 55 to be supplied to the inside of the furnace 10. The one side of the liquefied raw material supply pipe 57 may be operatively connected to the lower part of the furnace 10, preferably, to the section positioned below the middle part of the electrode 30, and may be wound around the outer circumference surface of the furnace 10 to sufficiently absorb the heat from the furnace 10. Preferably, the liquefied raw material inflow pipe 51 may be operatively connected to the upper part of the heat absorption tank 93 and may be perpendicular to the bottom of the furnace 10. This structure allows the liquefied raw material to be vertically supplied from the upper part to the lower part to the chamber 55 of the heat absorption tank 93. Accordingly, the liquefied raw material supplied to the chamber 55 more directly and more easily reaches the bottom surface of the heat absorption tank 93 in contact with a high temperature plasma reaction zone inside the furnace 10, thereby enhancing the efficiency on heat absorption. The liquefied raw material inflow pipe 51 may be horizontal to the bottom of the furnace 10 and may be operatively connected to a side of the heat absorption tank 93. This structure is favorable when a number of liquefied raw material inflow pipes 51 are operatively connected to the heat absorption tank 93. For example, when a plurality or a number of liquefied raw material inflow pipes 51 are operatively connected to the heat absorption tank 93 to face each other, the liquefied raw material supplied to the chamber 55 of the heat absorption tank 93 through each liquefied raw material inflow pipe 51 is more effectively mixed. The third embodiment illustrates a single liquefied raw material inflow pipe 51 which is operatively connected to the upper part of the heat absorption tank 93 and which is perpendicular to the bottom of the furnace 10. Since the structure in which the liquefied raw material inflow pipe 51 is operatively connected to the heat absorption tank and is horizontal to the bottom of the furnace is considered to be easily applicable and carried out by those skilled in the art, based on the third embodiment of the present invention, it is not presented in drawings. The third embodiment illustrates that the liquefied raw material inflow pipe 51 is operatively connected to the heat absorption tank 93 in order to supply the liquefied raw material to the heat absorption tank 93. However, the liquefied raw material may be injected into the chamber 55, using an injecting device (not shown) being operatively connected to the heat absorption tank 93. This modification is obviously within the scope of the present invention.

A gas supply pipe 53 is operatively connected to the liquefied raw material inflow pipe 51, thereby allowing the liquefied raw material and the gas for separating the liquefied raw material in fine particles to flow into the chamber 55. When the liquefied raw material and the gas (for separating the liquefied raw material in fine particles) flow into the chamber through the gas supply pipe 53, the liquefied raw material is more effectively spread or activated.

A heater 59 as a heating unit for forcibly heating the liquefied raw material flowing into the chamber 55 is installed in the heat absorption tank 93. At a start point when a high temperature environment is incompletely formed in the broad area chamber 17 of the furnace 10, that is, at the beginning of operating the plasma reaction apparatus 50, the heater 59 forcibly heats or vaporizes the liquefied raw material flowing into the chamber 55.

The heater 59 is electrically connected to an outside power source (not shown). The heater 59 is positioned in the heat absorption tank 93 and protrudes in the chamber 55 of the heat absorption tank 93. Although the heater 59 may be installed inside a wall frame of the heat absorption tank 93, it is installed to protrude in the chamber 55 so that the raw material directly contacts with the surface of the heater 59 in the chamber 55 and is effectively vaporized. When the heater 59 is installed, components and portions for the electrical connection need to be coated with an insulating material in order to prevent an electric short inside the furnace 10.

According to the heat absorption tank 93 and its relevant constitution and structure as described above, the liquefied raw material flowing through the liquefied raw material inflow pipe absorbs heat in the chamber 55 and is dispersed or activated to be supplied to the inside of the furnace 10 through the liquefied raw material supply pipe 57. Accordingly, the liquefied raw material being supplied is more easily mixed with other raw materials (for example, the gaseous raw material) and is spread on the entire surface of the electrode, thereby enabling the plasma reaction to be more effectively performed.

Figure 9:
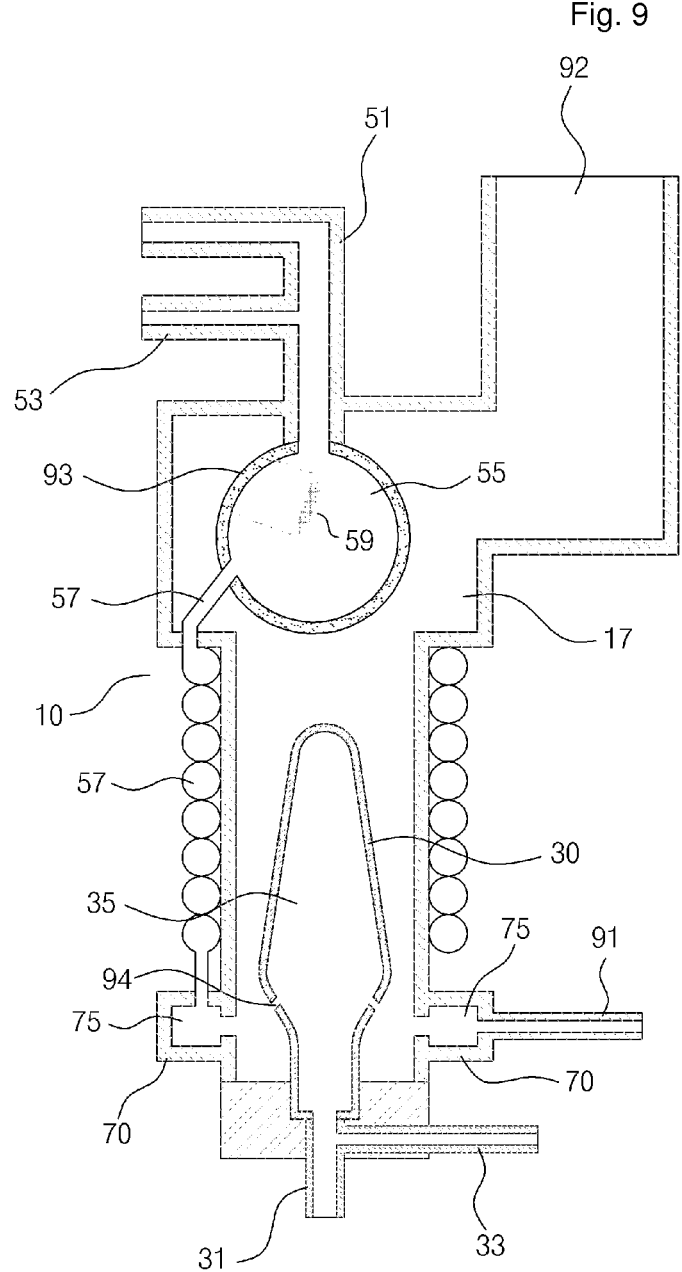
FIG. 9 is a vertical section view illustrating a plasma reaction apparatus according to a fourth embodiment of the present invention.

FIG. 9 is a vertical section view illustrating a plasma reaction apparatus according to a fourth embodiment of the present invention. In the plasma reaction apparatus according to the fourth embodiment, a mixing tank 70 is formed at an outer wall of the furnace 10, and a raw material inflow pipe 91 and a liquefied raw material supply pipe 57 are operatively connected to the furnace 10 by the mixing tank 70. A mixing chamber 75 of a predetermined volume is formed inside the mixing tank 70. Accordingly, the raw materials which respectively progress from the raw material inflow pipe 91 and the liquefied raw material supply pipe 57 are mixed in the mixing chamber 75 formed inside the mixing tank 70 and are supplied to the inside of the furnace 10. That is, the mixing tank 70 is operatively connected to the raw material inflow pipe 91, the liquefied raw material supply pipe 57 and the furnace 10. The constitution of the mixing tank 70 as described above improves the mixability of the raw materials which are supplied through the raw material inflow pipe 91 and the liquefied raw material supply pipe 57. An additional heating unit (not shown) may be installed in the mixing tank 70 if necessary.

Figure 10:
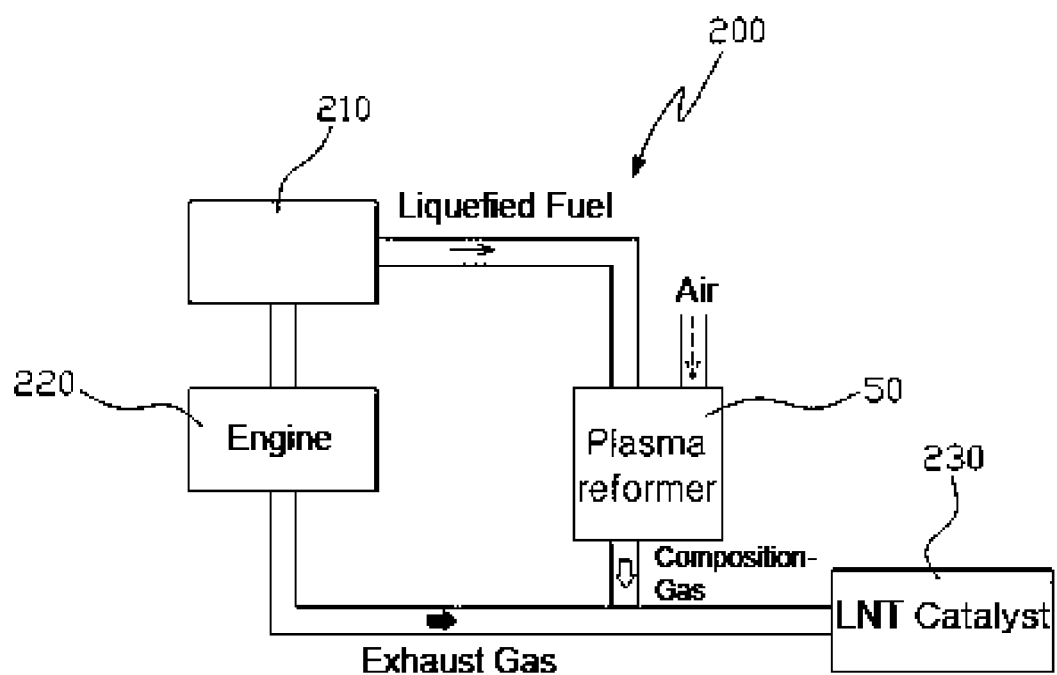
FIG. 10 is a schematic view illustrating an apparatus for decreasing NOx according to the present invention.
Figure 11:
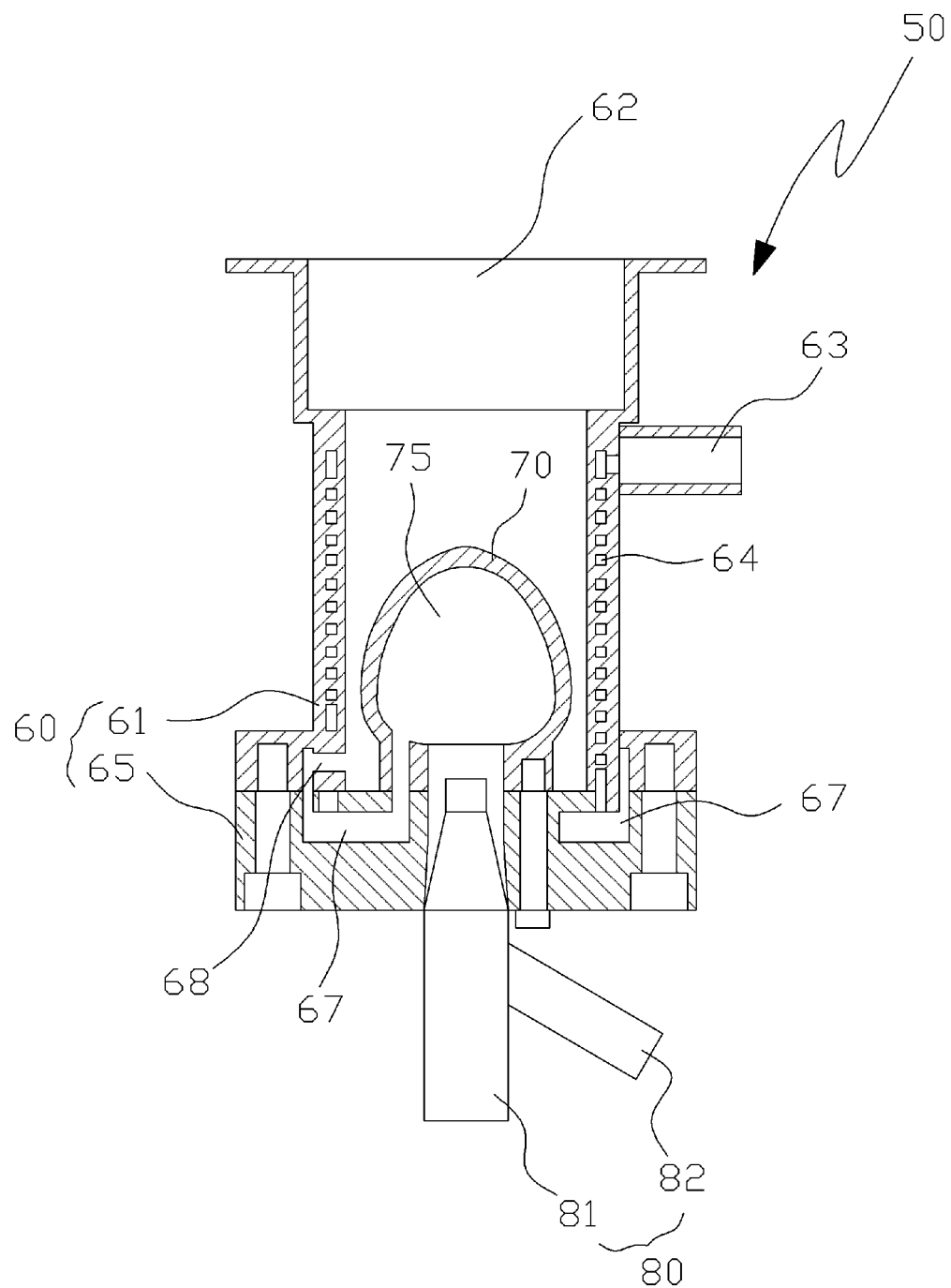
FIG. 11 is a sectional view of a plasma reactor in an apparatus for decreasing NOx according to a fifth embodiment of the present invention.

FIG. 10 is a schematic view illustrating an apparatus for decreasing NOx according to the present invention; FIG. 11 is a sectional view of a plasma reactor in an apparatus for decreasing NOx, according to a fifth embodiment of the present invention, and FIG. 12 is a sectional view of a flow of a fluid in the plasma reactor of FIG. 11. An apparatus for decreasing NOx moves an exhaust gas, which is released from an engine using hydrocarbon fuel supplied from a storage, to an occlusion catalyst; adsorbing NOx of the exhaust gas to the occlusion catalyst, and then reducing NOx to be removed. The apparatus for decreasing NOx comprises a plasma reactor which is connected to a path through which the exhaust gas is moved from the engine to the occlusion catalyst and which reforms the hydrocarbon fuel partially supplied from the storage to a reducing ambient gas of high temperature from the plasma reactor by a plasma reaction.

The apparatus for decreasing NOx comprises a body; an electrode; and a liquefied fuel injection unit. The body includes a furnace and a base. The furnace includes a discharge opening and a hollow. The discharge opening is formed at one side of the furnace. The hollow includes a heat absorption path formed in a wall frame forming the thickness of the furnace, and the heat absorption path allows a gas flowing from a gas inflow opening to move and to absorb heat. The base forms the bottom of the furnace and includes a mixing chamber. The mixing chamber is operatively connected to the heat absorption path and the inside of the furnace through an inflow hole formed at the furnace. The electrode is spaced from an inner wall of the furnace, fixed to the base and protrudes in the furnace, in order to form a discharge voltage for a plasma reaction in the furnace. The electrode includes a heat absorption chamber which is operatively connected to the mixing chamber. Liquefied fuel flows into the heat absorption chamber. The liquefied fuel injection unit is fixed to the body and supplies the liquefied fuel to the heat absorption chamber of the electrode.

The apparatus for decreasing NOx with the above-described characteristics will be more clearly described with reference to a preferred embodiment thereof.

The apparatus for decreasing NOx according to the preferred embodiment of the present invention will be described, in detail, with reference to the accompanying drawings.

As illustrated in FIGS. 10 through 12, an apparatus 200 for decreasing NOx according to the present invention moves an exhaust gas, which is released from an engine 220 using hydrocarbon fuel supplied from a fuel tank 21 which is a storage storing the hydrocarbon fuel, to an occlusion catalyst 30 and removes NOx of the exhaust gas.

The occlusion catalyst 30 is called a lean NOx trap (LNT) catalyst. When NOx of the exhaust gas being moved is adsorbed, the occlusion catalyst 30 reduces NOx to be removed. Since the detailed constitution and action of the occlusion catalyst 30 are well known, no description thereof will be presented.

The apparatus 200 for decreasing NOx comprises a plasma reactor 50. When NOx is reduced by the occlusion catalyst 30, the plasma reactor 50 injects a reducing ambient gas of high temperature to be supplied to the occlusion catalyst 30. The plasma reactor 50 is connected to the fuel tank 210. The plasma reactor 50 acts as a reformer for reforming the hydrocarbon fuel, which is partially supplied from the fuel tank 210 to the plasma reactor 50, to the reducing ambient gas of high temperature by a plasma reaction.

In the plasma reactor 50, a discharge opening 62 may be installed towards the occlusion catalyst 30 so that the reducing ambient gas reformed by the plasma reaction is discharged from the plasma reactor 50 and is injected to the occlusion catalyst 30. The discharge opening 62 of the plasma reactor 50 may be simply operatively connected to a movement pipe 40 through which the exhaust gas is moved, as shown.

The characteristic constitution of the plasma reactor for generating the reducing ambient gas of high temperature from the hydrocarbon fuel will be described below:

The plasma reactor 50, which is used as the reformer in the apparatus 200 for decreasing NOx according to the present invention, largely comprises: a body 60, an electrode 70 and a liquefied fuel injection unit.

The body 60 includes a furnace 61 and a base 65.

The furnace 61 includes a hollow and has an about cylindrical shape. A discharge opening 62 is formed at one side of the furnace 51 and discharges a reacted matter after the plasma reaction. A gas inflow opening 63 is formed in the furnace 61 and allows a gas to flow into the inside of the furnace 61. A heat absorption path 64 is formed inside a wall frame forming the thickness of the furnace 61 and allows the gas flowing from the gas inflow opening 63 to move along a circumference direction and to absorb heat. The heat absorption path 64 is formed in an about coil shape, along the circumference direction of the furnace 61.

The base 65 forms the bottom of the furnace 61. A mixing chamber 67 of a predetermined volume is formed in the base 65. The mixing chamber 67 is operatively connected to the heat absorption path 64 formed in the wall frame of the furnace 61 and is simultaneously operatively connected to the inside of the furnace 61 through an inflow hole 68 formed at the furnace 61. Preferably, the inflow hole 68 may be formed to be tilted at a predetermined angle to a normal of an inner wall of the furnace 61, that is, in a swirl structure.

The furnace 61 and the base 65 may be formed in one body or may be separately formed to be connected to each other. The base 65 needs to include an insulator (not shown), such as ceramic, to prevent the application of an electric current between a lower part of the electrode 70, which will be described below, and the furnace 61.

The electrode 70 is to generate a discharge voltage for the plasma reaction in the furnace 61. For this purpose, the electrode 70 is spaced from the inner wall of the furnace 61 at a predetermined interval and is fixed to the base 65 to protrude in the furnace 61. The electrode has an about conical shape. A heat absorption chamber 75 is formed in the electrode. The heat absorption chamber 75 is operatively connected to the mixing chamber 67. Liquefied fuel being supplied from the liquefied fuel injection unit flows into and temporarily stays in the heat absorption chamber 75.

The liquefied fuel injection unit is connected to the fuel tank 210 and supplies the liquefied fuel stored in the fuel tank 210 to the heat absorption chamber 75 of the electrode 70. The liquefied fuel injection unit is fixed to the body 60. A liquefied fuel injection device 80 or an injector (not shown) may be used as the liquefied fuel injection unit. The liquefied fuel injection device 80 injects the liquefied fuel to the absorption chamber 75 by a movement force of a gas supplied from the fuel tank 210, together with the liquefied fuel. The injector (not shown) directly injects the liquefied fuel to the heat absorption chamber 75 of the electrode 70.

FIGS. 11 and 12 illustrates the liquefied fuel injection device 80 used as the liquefied fuel injection unit.

That is, the liquefied fuel injection device 80 includes the liquefied fuel supply pipe 81, which is operatively connected to the fuel tank 210 and supplies the liquefied fuel, and a gas supply pipe 82, which is operatively connected to an outside gas supply source, independently from the liquefied fuel supply pipe 81, and supplies a gas, thereby allowing the inflow of the liquefied fuel and the gas simultaneously. The side from which the liquefied fuel and gas are injected face towards the heat absorption chamber 75 of the electrode.

An operational example of the apparatus for decreasing NOx according to the present invention will be described below:

An exhaust gas, which is generated according to the operation of an engine 220, is moved to an occlusion catalyst 30 through a movement pipe 40. The movement pipe 40 is operatively connected to the side of a discharge opening 62 of a plasma reactor 50, so that a reducing ambient gas of high temperature generated from the plasma reactor 50 is moved to the occlusion catalyst 30 and speeds up a reducing action of NOx in the occlusion catalyst 30.

The action of the plasma reactor 50 will be described in more detail. The plasma reactor 50 receives hydrocarbon fuel supplied from a fuel tank 210 through a liquefied fuel injection device 80 and simultaneously allows an inflow of air including $O_2$, which acts as an oxidizer needed upon a reforming reaction of the liquefied fuel (hydrocarbon fuel) being supplied, through a gas inflow opening 63. When temperature sufficiently rises and is activated, the air is moved to a mixing chamber 67 through a heat absorption path 64. When the liquefied fuel, which is moved to a heat absorption chamber 75 of an electrode 70 through the liquefied fuel injection device 80, absorbs heat in the heat absorption chamber 75 and is vaporized and activated, the liquefied fuel is moved to the mixing chamber 67 to be mixed with the air in the mixing chamber 67 and then flows into a furnace 61 through an inflow hole 68.

In accordance with the forgoing, it is noted that after the air and the liquefied fuel being supplied are sufficiently mixed in the mixing chamber 67, they flow into the furnace 61. Furthermore, since the liquefied fuel is directly injected from the heat absorption chamber 75 and the liquefied fuel is prevented from directly contacting with the outer surface of the electrode 70, the wetting and coking phenomena of the liquefied fuel are prevented. Furthermore, since the liquefied fuel absorbing heat in the heat absorption chamber 75 is immediately mixed with the air in the mixing chamber 67, the liquefied fuel is basically prevented from being liquefied during its movement.

The mixed fuel of the liquefied fuel and the air which are supplied to the inside of the furnace through the inflow hole 68 makes a plasma reaction with relatively high efficiency, compared to a volume, because of the characteristic structures of the inflow hole 68 and the electrode 70. That is, in accordance with the present invention, since the electrode 70 has a conical shape and the inflow hole 68 is formed in the swirl structure, the mixed fuel flowing into the furnace through the inflow hole 68 continuously makes the plasma reaction, along the circumference direction of the electrode 70.

In the plasma reactor 50 as described above, the reducing ambient gas, which is generated by reforming the liquefied fuel and the air as the oxidizer being first supplied, may be hydrocarbon (HC), carbon monoxide (CO) or hydrogen (H2). On the conditions that the ambient gas is supplied, NOx is reduced to a nitrogen (N2) gas.

Furthermore, when the plasma reactor 50, which is illustrated in FIG. 10 as the schematic view of the apparatus for decreasing NOx according to the present invention, uses the constitution of the plasma reaction apparatus 50 described with reference to the first through fourth embodiments, the same effects as the fifth embodiment are obtained.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A plasma reaction apparatus comprising:

a furnace being hollow, the furnace including a first raw material inflow pipe connected to a lower part of the furnace for supplying a first raw material into the furnace, the first raw material inflow pipe being configured to receive the first raw material for a plasma reaction, a discharge opening formed in an upper side of the furnace, the discharge opening being configured to discharge a plasma reactant, and a broad area chamber having a predetermined width and positioned within inside the furnace, the broad area chamber being configured to expand a plasma reaction zone and let the plasma reaction zone temporarily stay in the broad area chamber upon the plasma reaction of the first raw material being supplied into the furnace;

an electrode inserted in a bottom wall of the furnace, protruded into the furnace, and spaced from wall surfaces of the furnace at a predetermined interval the electrode being configured to generate a discharge voltage for the plasma reaction of the first raw material;

a heat absorption tank positioned in the broad area chamber, the heat absorption tank being connected to a second raw material inflow pipe and a first material supply pipe, the heat absorption tank having a heat absorption chamber, the heat absorption chamber being formed in the heat absorption tank and having a spherical shape, the heat absorption chamber including a heating unit within the heat absorption chamber, the heating unit being configured to heat a liquefied second raw material flowing through the heat absorption chamber, the second raw material inflow pipe opening into the heat absorption chamber for supplying the second raw material to the heat absorption chamber, and a first end of the first raw material supply pipe opening into the heat absorption chamber so as to supply the second raw material from the heat absorption chamber into the furnace, wherein a part of the first raw material supply pipe is wound around an outer circumferential surface of the furnace; and a mixing tank formed on an outer wall of the furnace, the mixing tank being connected to the first raw material inflow pipe and a second end of the first raw material supply pipe, the mixing tank having a mixing chamber, the mixing chamber being configured to mix the raw materials from the first raw material inflow pipe and the first raw material supply pipe and supply these materials into the furnace, wherein an upper part of the furnace is bent to form a step at a right angle so that the discharge opening is displaced laterally from a vertical extension line of the broad area chamber, wherein an upper part of the electrode has a conical shape and a lower part of the electrode has a cylindrical shape such that a width of a middle part of the electrode between the lower and upper parts is larger than respective widths of the upper and lower parts, the upper, lower and middle parts being exposed in the interior of the furnace, wherein the electrode includes a raw material inflow chamber, a second raw material supply pipe connected to a bottom end of the electrode and configured to carry additional liquefied raw material into the raw material inflow chamber, and an inflow path formed through wall of the electrode and configured to allow the additional raw material in the raw material inflow chamber to flow into the furnace, and wherein the second raw material supply pipe is connected to a gas supply pipe configured to carry a gas into the raw material inflow chamber so as to atomize the additional liquefied raw material.

2. The plasma reaction apparatus of claim 1, wherein the heating unit is electrically connected to a power source and installed to protrude in the heat absorption chamber.

3. The plasma reaction apparatus of claim 1, wherein the second raw material inflow pipe is connected to an upper part of the heat absorption tank and is perpendicular to the bottom surface of the furnace.

4. The plasma reaction apparatus of claim 1, wherein the second raw material inflow pipe is connected to a side of the heat absorption tank and is horizontal to the bottom surface of the furnace.

5. The plasma reaction apparatus of claim 1, wherein one side of the second raw material supply pipe is connected to a lower part of the furnace.

6. The plasma reaction apparatus of claim 1, wherein the gas supply pipe connected to the second raw material supply pipe is a first gas supply pipe, the second raw material inflow pipe is connected to a second gas supply pipe, and the second gas supply pipe is configured to carry a gas into the heat absorption chamber so as to atomize the second raw material.

* * * * *